US012113366B2

(12) United States Patent
Madawala et al.

(10) Patent No.: US 12,113,366 B2
(45) Date of Patent: Oct. 8, 2024

(54) RESONANT FREQUENCY COMPENSATION

(71) Applicant: Auckland UniServices Limited, Auckland (NZ)

(72) Inventors: Udaya Kumara Madawala, Stonefields (NZ); Duleepa Jayanath Thrimawithana, Mt Wellington (NZ)

(73) Assignee: AUCKLAND UNISERVICES LIMITED, Auckland (NZ)

(*) Notice: Subject to any disclaimer, the term of this patent is extended or adjusted under 35 U.S.C. 154(b) by 0 days.

(21) Appl. No.: 15/500,314

(22) PCT Filed: Aug. 11, 2015

(86) PCT No.: PCT/NZ2015/050105
§ 371 (c)(1),
(2) Date: Jan. 30, 2017

(87) PCT Pub. No.: WO2016/024868
PCT Pub. Date: Feb. 18, 2016

(65) Prior Publication Data
US 2017/0222488 A1 Aug. 3, 2017

(30) Foreign Application Priority Data
Aug. 11, 2014 (NZ) .................................. 628544

(51) Int. Cl.
H02J 50/12 (2016.01)
H01F 38/14 (2006.01)
(Continued)

(52) U.S. Cl.
CPC .............. *H02J 50/12* (2016.02); *H01F 38/14* (2013.01); *H02J 7/00712* (2020.01);
(Continued)

(58) Field of Classification Search
CPC ............ H02J 5/005; H02J 50/10; H02J 50/12; H02J 7/025; H01F 38/14; B60L 11/182; H02M 7/53878
See application file for complete search history.

(56) References Cited

U.S. PATENT DOCUMENTS 6,114,930 A * 9/2000 Gobbi .................... H03H 11/28
327/285
9,761,370 B2 * 9/2017 Wu ......................... H01F 38/14
(Continued)

FOREIGN PATENT DOCUMENTS

WO WO-2010062198 6/2010
WO 2011099071 A1 8/2011
(Continued)

OTHER PUBLICATIONS

"International Application No. PCT/NZ2015/050105, International Preliminary Report on Patentability dated Feb. 23, 2017", (Feb. 23, 2017), 7 pgs.
(Continued)

Primary Examiner — Gary L Laxton
(74) Attorney, Agent, or Firm — Pilloff Passino & Cosenza LLP; Martin J. Cosenza

(57) ABSTRACT

A wireless power transfer apparatus has a resonant circuit electrically coupled to a power converter. The resonant circuit includes a magnetic coupler $L_{pt}$ for magnetic coupling with a second apparatus. A controller associated with the power converter is configured to vary a relative phase of operation of the power converter with respect to the second apparatus, the phase being varied to at least partially compensate for variations in a resonant frequency of the resonant circuit.

38 Claims, 8 Drawing Sheets

(51) Int. Cl.
*H02J 7/00* (2006.01)
*H02M 3/335* (2006.01)
*H02M 3/337* (2006.01)
*H02J 50/60* (2016.01)
*H02J 50/90* (2016.01)

(52) U.S. Cl.
CPC .............. *H02M 3/33523* (2013.01); *H02M 3/33576* (2013.01); *H02M 3/3372* (2013.01); *H02J 50/60* (2016.02); *H02J 50/90* (2016.02); *Y02B 70/10* (2013.01)

(56) References Cited

U.S. PATENT DOCUMENTS

| | | | |
|---|---|---|---|
| 9,768,622 B2* | 9/2017 | Hayashi | H02J 50/12 |
| 2008/0265684 A1* | 10/2008 | Farkas | H02J 50/12 |
| | | | 307/104 |
| 2011/0084652 A1* | 4/2011 | Julstrom | H02J 50/70 |
| | | | 320/108 |
| 2011/0254379 A1* | 10/2011 | Madawala | B60L 53/12 |
| | | | 307/104 |
| 2012/0068548 A1 | 3/2012 | Endo et al. | |
| 2013/0015720 A1 | 1/2013 | Shimokawa et al. | |
| 2013/0088090 A1* | 4/2013 | Wu | H01F 3/08 |
| | | | 336/84 R |
| 2013/0207482 A1 | 8/2013 | Madawala et al. | |
| 2014/0159500 A1 | 6/2014 | Sankar | |
| 2014/0340031 A1* | 11/2014 | Mi | H02J 50/00 |
| | | | 320/108 |
| 2015/0049518 A1* | 2/2015 | Harrison | H02M 7/4807 |
| | | | 363/17 |
| 2015/0249345 A1* | 9/2015 | Kashiwagi | H02J 5/005 |
| | | | 307/104 |
| 2015/0349538 A1* | 12/2015 | Agostinelli | H02J 50/12 |
| | | | 307/104 |

FOREIGN PATENT DOCUMENTS

| | | |
|---|---|---|
| WO | WO-2012005607 | 1/2012 |
| WO | 2012035745 A1 | 3/2012 |
| WO | 2013002651 A1 | 1/2013 |
| WO | WO-2016024868 | 2/2016 |

OTHER PUBLICATIONS

"International Application No. PCT/NZ2015/050105, International Search Report and Written Opinion dated Nov. 30, 2015", (Nov. 30, 2015), 10 pgs.

Examination Report for EP Application No. 15 831 747.9, mailed Dec. 9, 2021.

Extended European Search Report for EP Application No. 15 831 747.9, mailed Jan. 12, 2018.

Chongwen Zhao et al., "Active resonance wireless power transfer system using phase shift control strategy," 2014 IEEE Applied Power Electronics Conference and Exposition—APEC 2014, IEEE, Mar. 16, 2014, pp. 1,336-1,341.

Michael J. Neath et al., "An Optimal PIO Controller for a Bidirectional Inductive Power Transfer System Using Multiobjective Genetic Algorithm," IEEE Transactions On Power Electronics, Institute of Electrical and Electronics Engineers, Mar. 1, 2014, pp. 1,523-1,531, vol. 29, No. 3.

Isaac Nam et al., "Novel control approach to achieving efficient wireless battery charging for portable electronic devices," Energy Conversion Congress and Exposition (ECCE), 2012 IEEE, IEEE, Sep. 15, 2012, pp. 2,482-2,491.

Amit Kumar Jain et al., "Pwm control of dual active bridge: Comprehensive analysis and experimental verification," IEEE Transactions on Power Electronics, Aug. 30, 2010, pp. 1,215-1,227, vol. 26, No. 4.

* cited by examiner

RESONANT FREQUENCY COMPENSATION

PRIORITY CLAIM TO RELATED APPLICATIONS

This application is a U.S. national stage application filed under 35 U.S.C. § 371 from International Application Serial No. PCT/NZ2015/050105, which was filed 11 Aug. 2015, and published as WO2016/024868 on 18 Feb. 2016, and which claims priority to New Zealand Application No. 628544, filed 11 Aug. 2014, which applications and publication are incorporated by reference as if reproduced herein and made a part hereof in their entirety, and the benefit of priority of each of which is claimed herein.

FIELD OF THE INVENTION

This invention relates to wireless power transfer. More particularly, though not exclusively, the invention relates to a system, apparatus, and/or method which compensates for changes in reactive impedance, such as those due to misalignment between the primary and secondary magnetic couplers in an inductive power transfer system.

BACKGROUND

Wireless or contactless power transfer, and more specifically inductive power transfer (IPT) technology, is now widely used in a variety of applications. An IPT system generally comprises a primary power converter which supplies an alternating current to energise a primary magnetic coupler (alternatively referred to as a coil, conductor, or pad, for example). The primary power converter and primary magnetic coupler together form the primary side of the IPT system. The secondary side of the system comprises a secondary magnetic coupler (alternatively referred to as a pick-up, coil, conductor, or pad, for example) electrically coupled to a secondary converter which may supply power to a load. For improved power transfer efficiency, the primary and secondary sides of the IPT system each generally further comprise a resonant circuit tuned to the frequency of the alternating current (or vice versa). The operating frequency usually depends on the application and can extend up to megahertz range.

The alternating current in the primary magnetic coupler creates a changing magnetic field, at least part of which passes through the secondary magnetic coupler during operation of the IPT system, inducing a voltage which is supplied to the secondary converter and thence the load. A major advantage of IPT systems, compared to traditional wired or closely-coupled power supplies, is that without the constraint of wires or a fixed mechanical coupling, the secondary side of the system is freely movable with respect to the primary side. Such systems are therefore suited for a wide variety of applications including stationary and dynamic electric vehicle (EV) charging and powering wearable computers, for example.

However, a problem arises from the relative movement of the primary and secondary coils in that the coils may become misaligned. Any such movement or misalignment results in variations in the coil inductances, which detunes the resonant circuits. This in turn leads to the converter circuits being presented with high volt-ampere (VA) loads, resulting in increased losses, instability, and reduced power throughput. Therefore, steps may be taken to compensate for the changes in inductance of the magnetic couplers enabling the IPT system to operate under tuned conditions.

A variety of circuit topologies and control methods capable of compensating for loss in performance of IPT systems due to misalignment have been proposed in the past. The majority of these technologies either employ a variable frequency switching scheme or switchable reactive elements in order to compensate for the changes in inductance. The former method is less attractive mainly as electromagnetic compatibility (EMC) standards, for example, require IPT systems to be operated within a strict frequency band, and changes in operating frequency may result in electromagnetic interference (EMI)-related issues. On the other hand, the use of switchable reactive elements, usually in the form of a series of capacitors with switches that can be switched in or out of the compensation circuit, is costly, bulky and requires a complicated controller, while compromising overall system reliability.

OBJECT OF THE INVENTION

It is an object of the invention to provide an inductive power transfer (IPT) system and method for operation which overcome or at least ameliorate one or more disadvantages of the prior art (including, but not limited to, those outlined above), or alternatively to at least provide the public or industry with a useful alternative.

SUMMARY OF INVENTION

In a first aspect, the invention may broadly be said to consist in a wireless power transfer apparatus suitable for magnetic coupling with a second apparatus, the wireless power transfer apparatus comprising:
 a power converter electrically coupled or coupleable with a power source or load;
 a resonant circuit electrically coupled with the power converter and comprising a magnetic coupler for magnetic coupling with the second apparatus; and
 a controller associated with the power converter and configured to vary a relative phase of operation of the power converter with respect to the second apparatus, the phase being varied to at least partially compensate for variations in a resonant frequency of the resonant circuit.

In one embodiment the relative phase is varied to control a reactive impedance of the resonant circuit.

More particularly, though not exclusively, the phase is varied to at least partially compensate for variations in an inductance of the magnetic coupler. Alternatively, or additionally, the phase may be varied to at least partially compensate for variations in a capacitance of the resonant circuit, and more particularly degradation of a tuning capacitor.

Variations in the inductance of the magnetic coupler may be caused by dynamic or static variations in the displacement or alignment between the wireless power transfer apparatus and the second apparatus, in use. The apparatus may comprise either a primary or secondary side of an inductive power transfer (IPT) system.

Preferably the relative phase is varied to substantially compensate for variations in the inductance of the magnetic coupler to maintain unity power factor.

Preferably the controller is further configured to vary a duty cycle of the power converter to control, and more preferably regulate, a magnitude of wireless power transfer. The power transfer may be to or from the wireless power transfer apparatus to the second wireless power transfer apparatus, or vice versa.

Preferably the power converter is controlled by the controller to generate a three-level modified square wave with a variable duty cycle. More particularly, the controller preferably controls the power converter using phase modulation.

Preferably the power converter comprises a reversible inverter/rectifier to allow for bi-directional power transfer.

More specifically, the power converter preferably comprises four switches in a full bridge configuration, and the controller operates the four switches in pairs with each pair out of phase. Preferably the duty cycle of each switch pair may be varied from 0-50% to vary the duty cycle of the power converter. Preferably the controller varies the duty cycle of the converter by varying the phase angle over which each switch pair conducts.

Alternatively, the power converter may comprise a half-bridge converter or push-pull converter.

Preferably the resonant circuit comprises an inductor-capacitor-inductor (LCL) network.

Alternatively, the resonant circuit may comprise a series-tuned inductor-capacitor (LC) resonant network or a push-pull parallel-resonant converter (PPRC).

In a second aspect, the invention may broadly be said to consist in a method for controlling a first wireless power transfer apparatus magnetically coupled or coupleable with a second wireless power transfer apparatus, the method comprising:
varying a relative phase of operation of the first wireless power transfer apparatus with respect to the second wireless power transfer apparatus to control a reactive impedance to at least partially compensate for variations in a resonant frequency of the resonant circuit.

In one embodiment the method includes detecting an inductance or variations in the inductance of the first wireless power transfer apparatus.

Preferably the method comprises at least partially compensating for variations in the inductance of the magnetic coupler, and more preferably substantially compensating for variations in the inductance of the magnetic coupler to maintain unity power factor.

Preferably the method further comprises varying a duty cycle of the first wireless power transfer apparatus to control a magnitude of power transfer with the second wireless power transfer apparatus. The power transfer may be to or from the second wireless power transfer.

In a third aspect, the invention may broadly be said to consist in a wireless power transfer system comprising:
a first wireless power transfer apparatus according to the first aspect of the invention; and
a second wireless power transfer apparatus magnetically coupled or coupleable with the first wireless power transfer apparatus.

The wireless power transfer system may be uni-directional or bi-directional. More specifically, the system may be configured to transfer power:
only from the first wireless power transfer apparatus to the second wireless power transfer apparatus; or
only from the second wireless power transfer apparatus to the second wireless power transfer; or
in either direction between the first wireless power transfer apparatus and the second wireless power transfer apparatus.

Preferably the second wireless power transfer apparatus also comprises a wireless power transfer apparatus according to the first aspect of the invention, wherein the controller is configured to vary a relative phase of operation of the power converter with respect to the first wireless power transfer apparatus. Alternatively, however, the second wireless power transfer apparatus need not necessarily comprise a controller associated with a power converter and configured to vary a relative phase of operation of the power converter with respect to the first apparatus.

Preferably the first and second wireless power transfer apparatuses each comprise a bi-directional power converter, and in particular a reversible rectifier/inverter, to allow for bi-directional power transfer.

Alternatively, the second wireless power transfer apparatus may comprise a passive diode bridge rectifier.

In a fourth aspect, the invention may broadly be said to consist in a wireless power transfer system comprising:
a primary wireless power transfer apparatus comprising:
a primary power converter electrically coupled or coupleable with a power source or load;
a primary resonant circuit electrically coupled with the primary power converter and comprising a primary magnetic coupler; and
a primary controller associated with the primary power converter to control operation thereof; and
a secondary wireless power transfer apparatus comprising:
a secondary resonant circuit comprising a secondary magnetic coupler for magnetic coupling with the primary magnetic coupler;
a secondary power converter electrically coupled with the secondary power converter and coupled or coupleable with a power source or load; and
a secondary controller associated with the secondary power converter to control operation thereof,
wherein at least one of the primary and secondary controllers is operable to vary a relative phase angle between the primary and secondary wireless power transfer apparatuses to at least partially compensate for variations in a resonant frequency of at least one of the primary and secondary resonant circuits.

In a fifth aspect, the invention may broadly be said to consist in a method for controlling a wireless power transfer system comprising primary and secondary wireless power transfer apparatuses, the method comprising:
detecting an inductance or variations in the inductance of a magnetic coupler of at least one of the primary and secondary wireless power transfer apparatuses; and
varying a relative phase of operation of the primary and secondary wireless power transfer apparatuses to control a reactive impedance to at least partially compensate for variations in coupler resonant frequency of at least one of at least one of the primary and secondary wireless power transfer apparatuses.

Preferably the method comprises at least partially compensating for variations in the inductance of at least one of the primary and secondary magnetic couplers, and more preferably substantially compensating for variations in the inductance of at least one of the primary and secondary magnetic couplers to maintain unity power factor and/or improve efficiency.

Preferably the method further comprises varying a duty cycle of at least one of the primary and secondary wireless power transfer apparatuses to control a magnitude of power transfer therebetween.

In another aspect the invention provides a wireless power transfer apparatus suitable for magnetic coupling with a second apparatus, the wireless power transfer apparatus comprising:
a power converter electrically coupled or coupleable with a power source or load;

a resonant circuit electrically coupled with the power converter and comprising a magnetic coupler for magnetic coupling with the second apparatus; and a controller associated with the power converter and configured to vary a relative phase of operation of the power converter with respect to the second apparatus, the phase being varied to at least partially compensate for variations in a reactive impedance.

In another aspect the invention provides a method for controlling a first wireless power transfer apparatus magnetically coupled or coupleable with a second wireless power transfer apparatus, the method comprising:

varying a relative phase of operation of the first wireless power transfer apparatus with respect to the second wireless power transfer apparatus to control a reactive impedance to at least partially compensate for variations in a reactive impedance seen by a converter of the first wireless power transfer apparatus.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Figure 1:
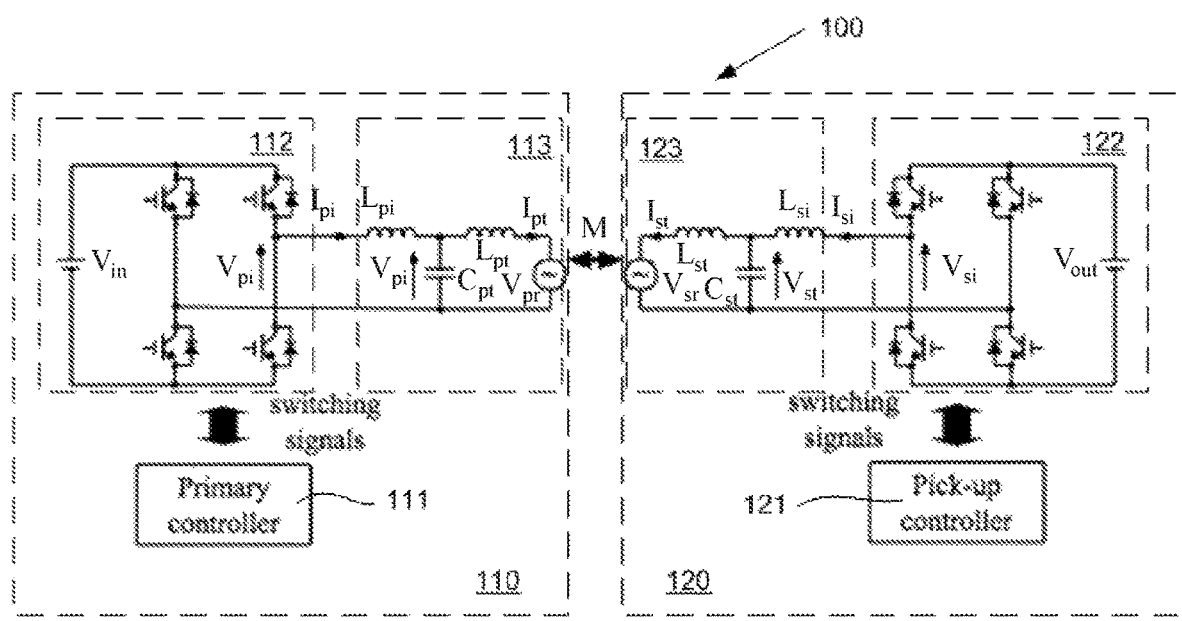
FIG. 1 is a schematic diagram of a first embodiment of an inductive power transfer (IPT) system according to the present invention.

The present invention comprises a wireless power transfer apparatus and system, and methods for controlling the same. Throughout the description like reference numerals will be used to refer to like features in different embodiments.

FIG. 1 schematically illustrates a bi-directional inductive power transfer (IPT) system 100 substantially as disclosed by International Patent Publication No. WO 2010/062198, the content of which is incorporated herein in its entirety. The example IPT system comprises a primary side 110 and a secondary side 120, in this example each electrically substantially identical. The primary side comprises a primary controller 111 which controls operation of the primary converter 112 comprising four switches in a full bridge circuit configuration. The primary converter is coupled to the primary power source/sink, $V_{in}$, and a resonant circuit 113. The resonant circuit 113 in this example comprises a tuned inductor-capacitor-inductor (LCL) circuit made up of series inductor $L_{pi}$, tuning capacitor $C_{pt}$, and primary magnetic coupler $L_{pt}$.

The secondary side 120 of the IPT system 111 similarly comprises a secondary controller 121, secondary converter 122, and LCL resonant circuit 123 comprising a secondary magnetic coupler $L_{st}$. The magnetic or inductive coupling between the primary and secondary magnetic couplers $L_{pt}$, $L_{st}$ is represented by the mutual inductance M and voltage sources $V_{pt}$ and $V_{st}$, respectively.

Figure 2:
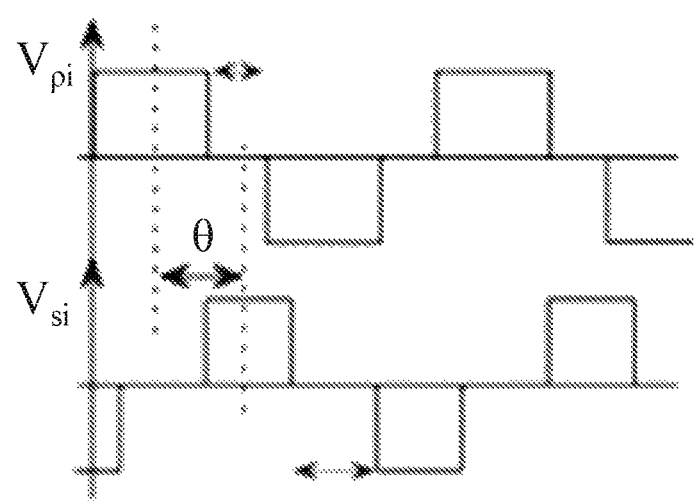
FIG. 2 illustrates example primary and secondary voltage waveforms according to the embodiment of FIG. 1.

As disclosed in WO 2010/062198, the primary controller 111 preferably drives the switches of the primary converter 112 in pairs at a fixed frequency $f_T$ (preferably equal to the designed resonant frequency of the resonant circuit 113) to produce a voltage waveform $V_{pi}$ as shown by way of example in FIG. 2. In this example, the voltage waveform comprises a three-level modified square wave. The phase angle $\varphi_p$ over which each pair of switches in the primary converter 112 (in this case, functioning as an inverter) remains switched on may be varied (between 0° and 180°), thereby determining the duty cycle ($\varphi_p/(\pi-\varphi_p)$) of the converter to control the magnitude of the alternating current $I_{pi}$ supplied to the primary magnetic coupler, $L_{pt}$. Similarly, the phase angle $\varphi_s$ over which each pair of switches in the secondary converter 122 (in this case, functioning as a rectifier) remains switched on may be varied (between 0° and 180°), thereby determining the duty cycle ($\varphi_s/(\pi-\varphi_s)$) of the converter.

Referring still to FIG. 1 and FIG. 2, the secondary converter 122 is controlled by the pick-up/secondary controller 121 similarly to the primary converter 112 to produce a secondary voltage waveform $V_{si}$ with controllable duty cycle. Wireless power transfer takes place across an air-gap between primary and pick-up magnetic couplers $L_{pt}$, $L_{st}$ which are loosely coupled to each other through mutual inductance M.

When power is transferred from the primary side to the secondary side of the system, the secondary converter 122 functions as a rectifier. However, as in this example at least some embodiments of the invention are capable of transferring power in either direction between the primary and secondary sides. In such bi-directional embodiments, the primary converter 112 and secondary converter 122 thus preferably each comprise an active reversible rectifier/inverter. The term "converter" as used throughout the description is therefore intended to encompass a rectifier (whether passive or active), an inverter, or a reversible inverter/rectifier, the appropriate selection of which is dependent on the application.

The relative phase angle θ and/or converter phase angles $\varphi_p$, $\varphi_s$ may be varied to control the magnitude and direction of power flow between the primary and secondary sides of the IPT system (dependent on the power requirements of the load coupled with the secondary side, for example). Often, the relative phase angle θ may be fixed or regulated at ±90° for unity power factor operation, while the magnitude of power transfer is controlled by varying the converter phase angles $\varphi_p$, $\varphi_s$. Alternatively, all three phase angles θ, $\varphi_p$, $\varphi_s$ may be varied to control the magnitude and direction of power flow.

According to the present invention, however, the relative phase angle θ is varied to control a compensating reactive impedance in order to compensate for any variation in reactance and thus maintain the tuning of both the primary and secondary magnetic couplers $L_{pt}$, $L_{st}$. The secondary output power $V_{out}$ is thus regulated independently of the amount of compensation applied to maintain the tuned condition.

To further explain the theory and operation of the present invention, a mathematical analysis of the IPT system of FIG. 1 is presented below.

The example IPT system shown in FIG. 1 employs identical electronics on both the primary and secondary side, each comprising a full-bridge converter and an LCL resonant network tuned to the fundamental frequency $f_T$ of $V_{pi}$ as given by Equation (1).

$$2\pi f_T = \omega_T = \frac{1}{L_{pi}C_{pt}} = \frac{1}{L_{pt}C_{pt}} = \frac{1}{L_{si}C_{st}} = \frac{1}{L_{st}C_{st}} \quad (1)$$

To simplify the analysis, the voltage $V_{pi}$ produced by the primary converter 112 can be represented by an equivalent sinusoidal voltage source that has a frequency $f_T$ and a phasor-domain magnitude as given by Equation (2).

$$V_{pi} = \frac{4V_{in}}{\pi}\sin\left(\frac{\varphi_p}{2}\right)\angle 0 \quad (2)$$

Similarly, the voltage produced by the secondary converter is given in the phasor-domain by Equation (3).

$$V_{si} = \frac{4V_{out}}{\pi}\sin\left(\frac{\varphi_p}{2}\right)\angle \theta \quad (3)$$

At steady state, the voltage $V_{sr}$ induced in the secondary magnetic coupler $L_{st}$ due to current $I_{pt}$ is given by Equation (4).

$$V_{sr} = j\omega M I_{pt} \quad (4)$$

Similarly, the voltage $V_{pr}$ reflected back into or induced in $L_{pt}$ due to current $I_{st}$ in $L_{st}$ can be expressed by Equation (5).

$$V_{pr} = j\omega M I_{st} \quad (5)$$

Under tuned conditions in Equation (1), the currents $I_{pi}$, $I_{pt}$, $I_{si}$ and $I_{st}$ can therefore be derived as given by Equations (6)-(9).

$$I_{pi} = j\frac{M}{\omega_T L_{pt} L_{st}} V_{si} \quad (6)$$

$$I_{pt} = -j\frac{1}{\omega_T L_{pt}} V_{pi} \quad (7)$$

$$I_{si} = j\frac{M}{\omega_T L_{pt} L_{st}} V_{pi} \quad (8)$$

$$I_{st} = -j\frac{M}{\omega_T L_{st}} V_{si} \quad (9)$$

Figure 3:
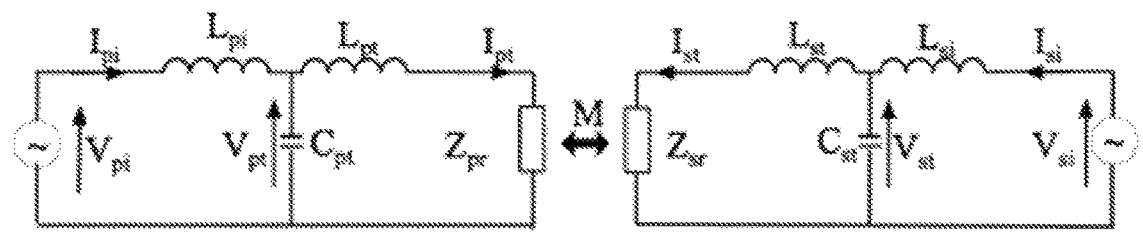
FIG. 3 is an equivalent circuit model of the system of FIG. 1.

The IPT system of FIG. 1 can thus be represented by the equivalent circuit model shown in FIG. 3, where the induced voltage sources $V_{pr}$, $V_{sr}$ are represented by complex impedances $Z_{pr}$, $Z_{sr}$ respectively. Using Equations (2)-(9), the complex impedances $Z_{pr}$ and $Z_{sr}$ can be derived as given by Equations (10) and (11).

$$Z_{pr} = \quad (10)$$
$$-\frac{\omega_T M L_{pt}}{L_{st}}\frac{\sin(\varphi_s)}{\sin(\varphi_p)}\sin(\theta) + j\frac{\omega_T M L_{pt}}{L_{st}}\frac{\sin(\varphi_s)}{\sin(\varphi_p)}\cos(\theta) = R_{pr} + jX_{pr}$$

$$Z_{sr} = -\frac{\omega_T M L_{pt}}{L_{pt}}\frac{\sin(\varphi_s)}{\sin(\varphi_p)}\sin(\theta) + j\frac{\omega_T M L_{st}}{L_{pt}}\frac{\sin(\varphi_s)}{\sin(\varphi_p)}\cos(\theta) = R_{sr} + jX_{sr} \quad (11)$$

As evident from Equations (10) and (11), both $Z_{pr}$ and $Z_{sr}$ comprise a resistive component ($R_{pr}$, $R_{sr}$ respectively) and a reactive component ($X_{pr}$, $X_{sr}$ respectively). The resistive components in $Z_{pr}$ and $Z_{sr}$ represent the real power transferred between the primary and the secondary sides of the system. The magnitudes of $R_{pr}$ and $R_{sr}$ can be controlled through $\varphi_p$, $\varphi_s$ and $\theta$ to regulate the amount and direction of power flow as discussed previously. The reactive components, $X_{pr}$ and $X_{sr}$, do not contribute towards real power flow. In IPT systems of the prior art, the reactive components are eliminated by operating the IPT system with a fixed relative phase difference $\theta$ of $\pm 90°$.

According to the present invention, the reactive components $X_{pr}$, $X_{sr}$ are, in effect, used to compensate for the changes in the resonant frequency of the primary and/or secondary resonant circuits. For example, variations in the inductance of the primary and secondary magnetic couplers $L_{pt}$, $L_{st}$ may be caused by static or dynamic variations in displacement or alignment therebetween.

The converter phases $\varphi_p$, $\varphi_s$ or duty cycle in each of the primary and secondary side of the IPT system are controlled to regulate the magnitudes of resistive components $R_{pr}$, $R_{sr}$ of the impedances $Z_{pr}$, $Z_{sr}$ and therefore the power transfer, whereas the relative phase difference $\theta$ is controlled to regulate the magnitudes of reactive components $X_{pr}$, $X_{sr}$ to negate changes in reactive impedance. Such changes in reactive impedance may affect the resonant frequency of the resonant compensation networks and thus prevent efficient power transfer. The variations in reactive impedance may be due to a variety of different factors, including but not limited to: changes in the inductance of the primary and/or secondary magnetic couplers $L_{pt}$, $L_{st}$ possibly due to misalignment of magnetic couplers; the presence of foreign (magnetically permeable) objects near one or the magnetic couplers; variations in component tolerances, for example degradation of a capacitor over time.

As a result, the magnitude and direction of power transfer as well as the amount of compensation can be controlled independently through the phase angles $\varphi_p$, $\varphi_s$ and $\theta$. For example, if the inductances of the primary and secondary magnetic couplers $L_{pt}$, $L_{st}$ decrease beyond their tuned values (i.e. the values selected for tuning the resonant circuit to the operating frequency $f_T$), $\theta$ is controlled to introduce extra inductive reactances in series with the primary and secondary magnetic couplers $L_{pt}$, $L_{st}$ to negate the decrease in inductance of the magnetic couplers. Meanwhile, the converter phase angles $\varphi_p$, $\varphi_s$ can be varied to control the magnitude and direction of power transfer at a desired level. Alternatively, a combination of $\varphi_p$, $\varphi_s$ and $\theta$ can also be varied, as appropriate, to meet the required power throughput as well as to compensate for any pad misalignment.

The proposed compensation can be realised by a controller on either or both of the primary or secondary/pick-up side of the IPT system which detects changes in tuning and controls one or more of $\varphi_p$, $\varphi_s$ and $\theta$ in order to mitigate these changes.

Figure 4:
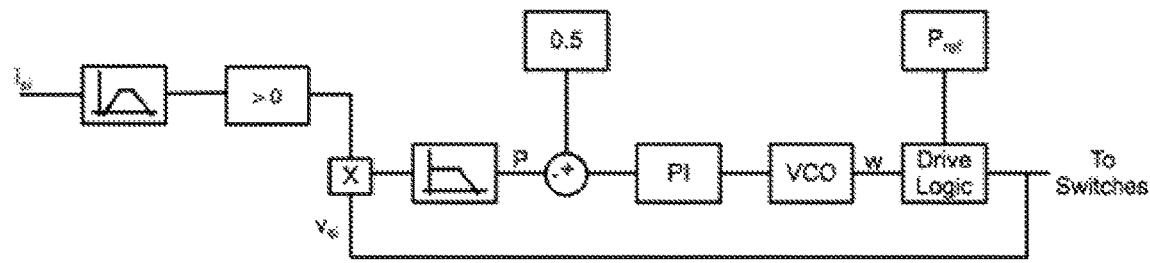
FIG. 4 is a block diagram of a possible controller according to the present invention, which is suitable for use in the system of FIG. 1.

A suitable secondary controller according to one embodiment of the invention is shown in FIG. 4 by way of example.

A change in inductance of, in this example, the secondary magnetic coupler $L_{st}$ is evaluated using measurements of the secondary voltage $V_{si}$ and current $I_{si}$. The evaluation may comprise calculation of the power P by multiplying the voltage $V_{si}$ and current $I_{si}$ as shown, for example. The evaluation is then compared with 0.5 to generate an error signal. The value of 0.5 is the value expected if θ is to be set to achieve minimum VA for the example controller shown. However, alternative values may be used if, for example, the objective is to maximise power transfer. The error signal forms an input to a control algorithm, in this case the proportional-integral controller PI. The output of the controller PI drives a voltage controlled oscillator VCO to obtain the phase angle θ required to compensate for changes in the system. This phase-shift is used together with the reference power level $P_{ref}$ to generate drive signals controlling operation of the converter 122. The phase of the primary IPT apparatus is taken into account in the multiplication of the secondary voltage and current, as the secondary current is related to the primary phase.

The controllers 111, 121 may be implemented purely in hardware, software, or combinations thereof. The controllers may therefore comprise a microcontroller communicatively coupled with voltage and current sensors and programmed to perform the methods of the invention as described herein by way of example. The electronic circuit design and programming techniques required for this are known to those skilled in the fields of digital electronics and/or embedded systems.

Figure 5:
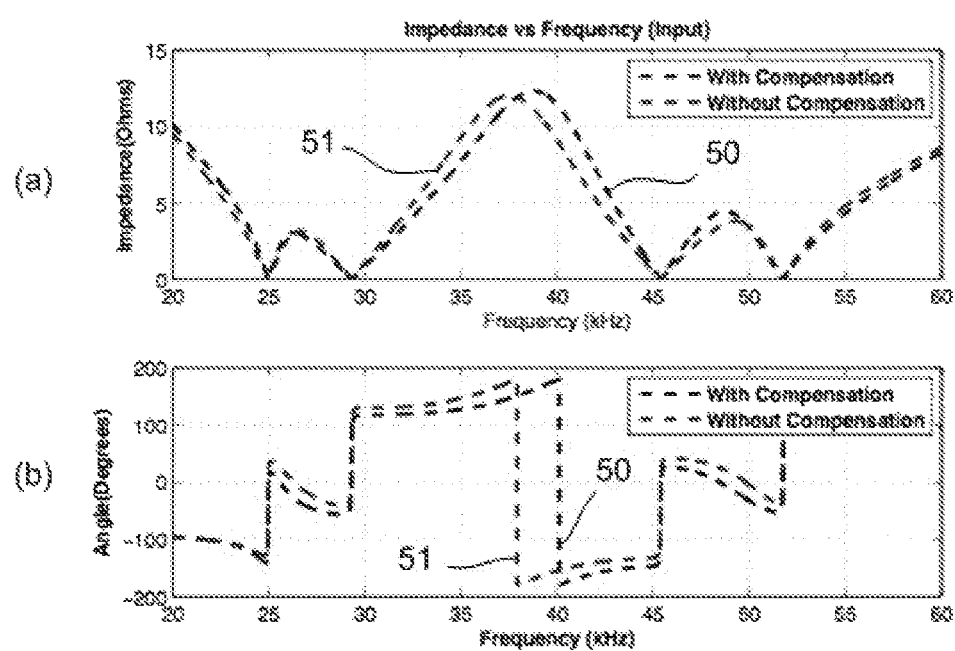
FIG. 5 show graphs of both compensated and uncompensated (a) input impedance and (b) angle versus frequency.
Figure 6:
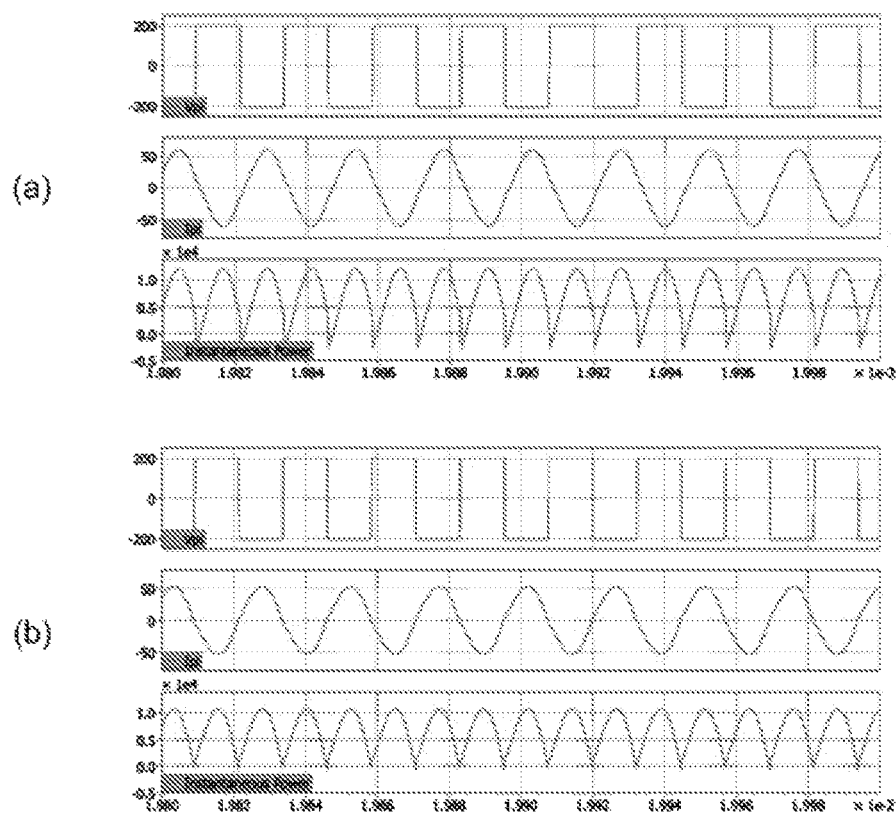
FIG. 6 shows (a) uncompensated and (b) compensated voltage and current waveforms of the embodiment of FIG. 1.
Figure 7:
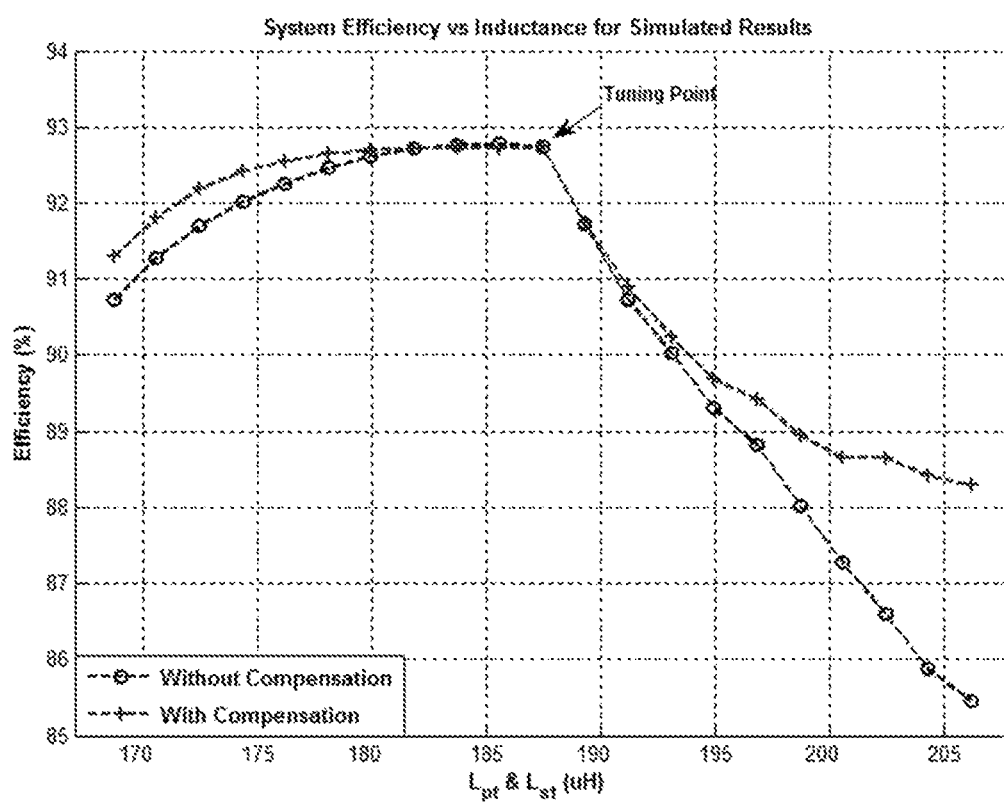
FIG. 7 is a graph of system efficiency of the embodiment of FIG. 1, with and without the compensation provided by the present invention.

Waveforms from a simulated IPT system according to the example embodiment of FIGS. 1-4 are shown in FIGS. 5-7. The simulated system comprised LCL resonant circuits tuned to 40 kHz. FIG. 5 shows graphs of both compensated 50 and uncompensated 51 (a) input impedance seen by the primary converter and (b) phase angle θ versus frequency f for a scenario where a 20% change in the inductance of both the primary and secondary magnetic couplers $L_{pt}$, $L_{st}$ has been introduced. In practice, such variations in the inductance of the magnetic couplers may be due to variations in the displacement or alignment therebetween.

Ideally, the impedance seen by the primary converter should be a purely resistive load at the operating frequency to operate the system at unity power factor. The results illustrated by the solid lines indicate the behaviour of the system without any compensation whereas the results in dotted lines represent the system behaviour when the changes in the magnetic coupler inductances $L_{pt}$, $L_{st}$ are compensated by varying the relative phase angle θ.

Without compensation, variation of the magnetic coupler inductances $L_{pt}$, $L_{st}$ causes the impedance curves to shift to the left, forcing the resonant frequency to around 38 kHz. The system becomes detuned, as the primary and secondary converters continue to operate at the designed frequency of 40 kHz, while the resonant frequency of the LCL networks has shifted to 38 kHz as a result of changes in the magnetic coupler inductances $L_{pt}$, $L_{st}$.

Varying the relative phase angle θ from 90° to 80° in accordance with the methods, apparatus, and systems of the present invention, as shown by the broken line impedance curves in FIG. 5, restores the resonant frequency of the primary and secondary LCL resonant circuits 113, 123 to or towards the original value of 40 kHz, and allows the system to be operated at unity power factor, or at least nearer unity power factor than would otherwise be the case.

Voltage and current waveforms $V_{pi}$, $I_{pi}$ waveforms obtained from the simulated IPT system with and without compensation according to the present invention are depicted in FIG. 6(a) and FIG. 6(b), respectively. As evident from FIG. 6(a), the current $I_{pi}$ is lagging the voltage $V_{pi}$, indicating that the system is operating under detuned conditions without the compensation of the present invention. Furthermore, it can be observed that the instantaneous power supplied by the primary converter 112 has a negative portion indicating operation below unity power factor. Referring to the compensated waveforms of FIG. 6(b), however, it can be observed that the voltage $V_{pi}$ and current $I_{pi}$ are in phase and the system operates at unity power factor.

The efficiency of the simulated system versus magnetic coupler inductance, with and without the proposed compensation of the present invention, is shown in FIG. 7. It can be observed that the compensation technique significantly improves the efficiency of the IPT system over a wide range of primary and secondary magnetic coupler inductances $L_{pt}$, $L_{st}$.

The above example embodiment of the invention comprises a bi-directional IPT system with a full bridge active reversible rectifier/inverter and LCL resonant circuits on both the primary and secondary sides, however the invention is not limited to such a configuration. In other embodiments, the IPT system may comprise a uni-directional (i.e. configured to transfer power in a single direction from the primary to the secondary side) system, an alternative active or passive converter such as a half-bridge or push-pull converter or passive (diode bridge) rectifier, and/or an alternative resonant circuit topology.

In some embodiments of IPT systems according to the present invention, specifically uni-directional embodiments, the secondary converter may comprise a passive diode bridge rectifier and omit the secondary controller for cost or complexity reasons. The passive rectifier limits the controllability of the magnitude of compensating reactive impedance, but the compensating impedance can still be controlled to some extent by the primary controller and primary converter, at the expense of load regulation at the output of the secondary side.

Figure 8:
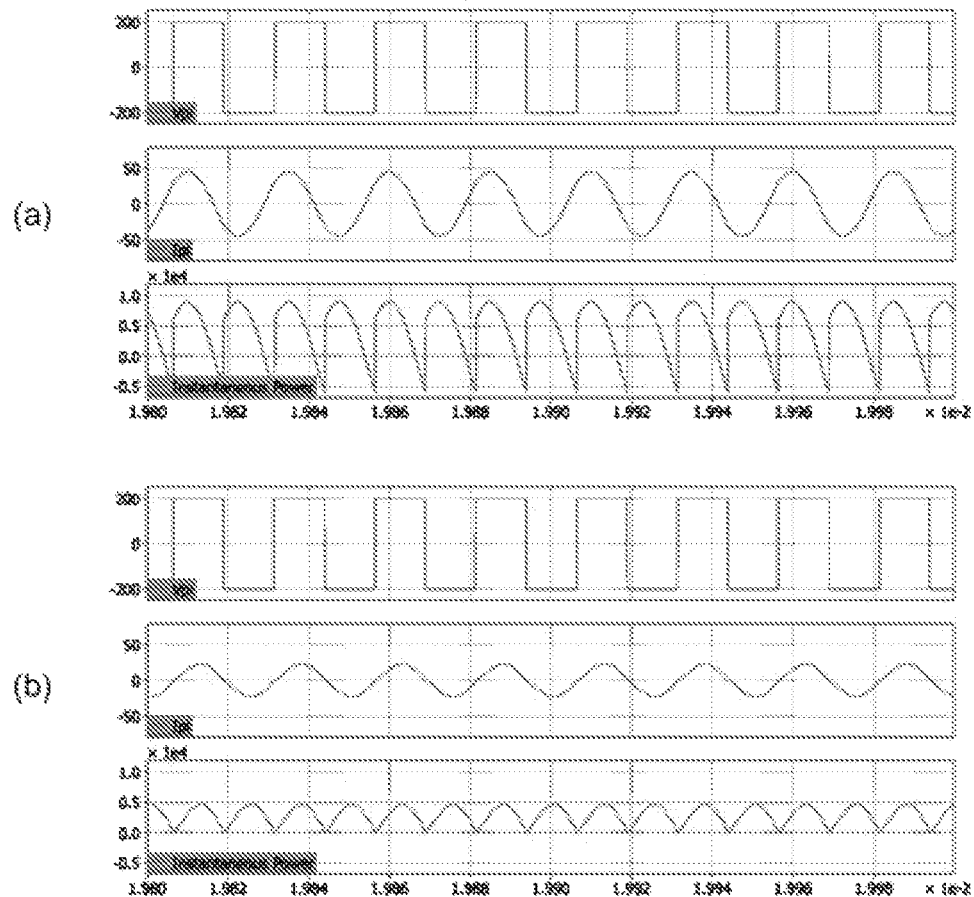
FIG. 8 shows (a) uncompensated and (b) compensated voltage and current waveforms of an alternative embodiment of an IPT system according to the present invention.
Figure 9:
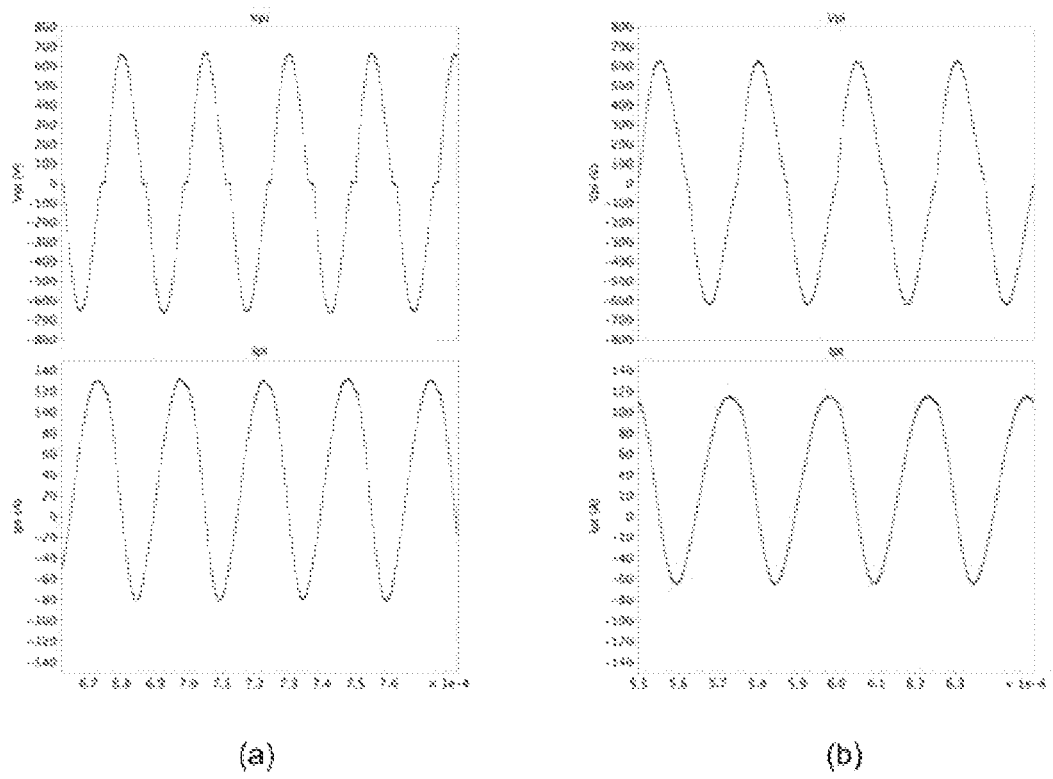
FIG. 9 shows (a) uncompensated and (b) compensated voltage and current waveforms of yet another embodiment of the invention.

In yet other embodiments, the resonant circuit may comprise a series-tuned LC resonant network or a push-pull parallel-resonant converter (PPRC), for example. Simulated waveforms for each of these embodiments are shown in FIGS. 8 and 9, respectively. FIGS. 8(a) and 8(b) respectively show the uncompensated and compensated voltage $V_{pi}$, current $I_{pi}$, and instantaneous power waveforms for a series-tuned LC resonant network embodiment. FIGS. 9(a) and 9(b) similarly show the respective uncompensated and compensated voltage $V_{pi}$ and current $I_{pi}$ waveforms for the PPRC-based embodiment. In both cases it can be observed that the compensation of the present invention restores the voltage $V_{pi}$ and current $I_{pi}$ waveforms to being substantially in phase with each other, resulting in an improved power factor and facilitating zero-voltage switching (ZVS).

In other embodiments, regulation of the output voltage or current may not be required, and the controllers thus need not necessarily be configured to vary the duty cycle of the power converter.

In yet other embodiments, the relative phase angle between the primary and secondary sides may be varied to control, at least in part, the magnitude of real power transfer. This may involve a compromise between controlling the magnitude of power transfer and compensating for variations in the resonant frequency of the primary and/or secondary resonant circuit. The appropriate balance will depend upon the application.

The above variations are described merely as non-limiting examples. Further modifications or variations may be made without departing from the spirit or scope of the invention.

Although the invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

From the foregoing it will be seen that a wireless power transfer apparatus, system, and method is provided which effectively compensates for changes in inductance arising from variations in the displacement or alignment of primary and secondary magnetic couplers. The compensation results in improved power factor and efficiency of wireless power transfer. This advantage can be achieved without varying the switching frequency or adding switchable reactive elements and, in at least some embodiments, without compromising load/output regulation.

Unless the context clearly requires otherwise, throughout the description, the words "comprise", "comprising", and the like, are to be construed in an inclusive sense that is to say, in the sense of "including, but not limited to", as opposed to an exclusive or exhaustive sense.

Any discussion of the prior art throughout the specification should in no way be considered as an admission that such prior art is widely known or forms part of common general knowledge in the field.

The invention claimed is:

1. A wireless power transfer apparatus suitable for magnetic coupling with a second apparatus, the wireless power transfer apparatus comprising:
    a power converter electrically coupled or coupleable with a power source or load;
    a resonant circuit electrically coupled with the power converter and comprising a magnetic coupler for magnetic coupling with the second apparatus; and
    a controller associated with the power converter and configured to vary a relative phase of operation of the power converter with respect to the second apparatus, the phase being varied to at least partially compensate for variations in a reactive impedance,
    wherein the wireless power transfer apparatus is configured to compensate for changes in the inductance of the magnetic coupler caused by misalignment of the magnetic coupler relative to the second apparatus.

2. The wireless power transfer apparatus as claimed in claim 1 wherein the controller is further configured to vary a duty cycle of the power converter to control a magnitude of wireless power transfer.

3. The apparatus of claim 2, wherein:
    the controller is configured to vary the duty cycle by varying a phase angle over which pairs of switches in the power converter remain switched on; and
    the apparatus is configured to vary the relative phase to introduce extra inductive reactances in series with respective first and second magnetic couplers of the wireless power apparatus and the second apparatus, the extra inductive reactances negating decrease in inductance of the first and second magnetic couplers.

4. The apparatus of claim 2, wherein:
    the controller is configured to vary the duty cycle by varying a phase angle over which pairs of switches in the power converter remain switched on; and
    the duty cycle is the phase angle divided by the value that is $\pi$ minus the phase angle.

5. The apparatus of claim 2, wherein:
    the controller is configured to vary the duty cycle by varying a phase angle over which pairs of switches in the power converter remain switched on, thereby controlling a magnitude of an alternating current supplied to the second apparatus.

6. The wireless power transfer apparatus of claim 1, wherein the controller is configured to control the reactive component of a load impedance, caused by mutual inductance between the first wireless power transfer apparatus and the second wireless power transfer apparatus, to compensate a reactive impedance in the resonant circuit.

7. The wireless power transfer apparatus of claim 1, wherein the controller is configured to tune the resonant circuit by introducing a compensatory reactive impedance, caused by mutual inductance between the first wireless power transfer apparatus and the second wireless power transfer apparatus, to compensate a reactive impedance in the resonant circuit.

8. The apparatus of claim 1, wherein:
    the second apparatus has a controller separate from the controller associated with the power converter; and
    the controller of the wireless power transfer apparatus is configured to detect changes in tuning of an inductance system of the wireless power transfer apparatus and controls the relative phase to mitigate the changes in tuning.

9. The wireless power transfer apparatus as claimed in claim 1 wherein the controller associated with the power converter is configured to vary the relative phase of operation of the power converter with respect to the second apparatus by within 10 degrees.

10. The wireless power transfer apparatus as claimed in claim 1 wherein the controller associated with the power converter is configured to vary the relative phase of operation of the power converter with respect to the second apparatus is configured to vary the relative phase angle between the primary apparatus and the secondary apparatus to control, at least in part, magnitude of real power transfer.

11. A method for controlling a first wireless power transfer apparatus magnetically coupled or coupleable with a second wireless power transfer apparatus, the method comprising:
    while respective coils of the first wireless power transfer apparatus and the second wireless power transfer apparatus are misaligned, varying a relative phase of operation of the first wireless power transfer apparatus with respect to the second wireless power transfer apparatus to compensate a reactive impedance of the first wireless power transfer apparatus, thereby compensating for changes in the inductance of the first wireless power transfer apparatus caused by the misalignment, wherein the coils remain misaligned.

12. The method as claimed in claim 11 further comprising varying a duty cycle of a power converter of the first wireless power transfer apparatus to control a magnitude of wireless power transfer.

13. The method of claim 11, wherein the method comprises reflecting a controlled reactive impedance, from the second wireless power transfer apparatus to the first wireless power transfer apparatus, to compensate a reactive impedance in a resonant circuit of the first wireless power transfer apparatus, wherein the method comprises controlling the reactive impedance reflected from the second wireless power transfer apparatus to the first wireless power transfer apparatus to offset variations in the reactive impedance in the resonant circuit of the first wireless power transfer apparatus.

14. The method of claim 11, wherein the method comprises controlling a resistive component of a load impedance, caused by mutual inductance between the first wireless power transfer apparatus and the second wireless transfer apparatus, by phase modulating a converter of the first wireless power transfer apparatus.

15. The method of claim 14, wherein the method comprises controlling a relative phase angle, between the converter of the first wireless power transfer apparatus and a converter of the second wireless power transfer apparatus, to control a reactive component of the load impedance.

16. The method of claim 11, wherein the method comprises controlling a relative phase angle between a converter of the first wireless power transfer apparatus and a converter of the second wireless power transfer apparatus to create a compensatory reactive impedance, wherein the relative phase angle is controlled to a value that is not positive 90 degrees and not negative 90 degrees.

17. The method of claim 16, wherein the method comprises controlling the compensatory reactive impedance to tune at least one of the first wireless power transfer apparatus or the second wireless power transfer apparatus to resonate at a frequency that corresponds to an operating frequency for resonant wireless power transfer between the first wireless power transfer apparatus and the second wireless power transfer apparatus.

18. The method of claim 11, further comprising:
transferring power from the first wireless power transfer apparatus to the second wireless power transfer apparatus while varying the relative phase of operation of the first wireless power transfer apparatus with respect to the second wireless power transfer apparatus; and
subsequent to transferring power from the first wireless power transfer apparatus to the second wireless power transfer apparatus, transferring power from the second wireless power transfer apparatus to the first wireless power transfer apparatus.

19. The method of claim 11, further comprising:
varying a converter phase angle of the first wireless power transfer apparatus; and
varying a converter phase angle of the second wireless power transfer apparatus, wherein
the varying of the relative phase introduces extra inductive reactances in series with respective first and second magnetic couplers of the first and second wireless power transfer apparatuses, the extra inductive reactances negating decrease in inductance of the first and second magnetic couplers.

20. The method of claim 11, wherein:
varying the relative phase controls a compensating reactive impedance, which in turn compensates for a variation in reactance during power transfer from the first wireless power transfer apparatus to the second wireless power transfer apparatus, thereby maintaining respective tuning of respective inductance systems of the first wireless power transfer apparatus and the second wireless power transfer apparatus.

21. The method of claim 20, further comprising:
regulating output voltage of the second wireless power transfer apparatus independently of amount of compensation applied to maintain the respective tuning.

22. The method of claim 11, wherein:
the variation of the relative phase decreases an inductance effect of magnetic coupling between the first and second wireless power transfer apparatus.

23. The method of claim 11, wherein:
impedance in the first wireless power transfer apparatus is not impacted by the variation of the relative phase.

24. The method of claim 11, further comprising:
irrespective of varying the relative phase, adjusting a magnitude of a resistive component of the first wireless power transfer apparatus and adjusting a magnitude of a resistive component of the second wireless power transfer apparatus.

25. The method of claim 11, wherein:
a resonance frequency of the first wireless power transfer apparatus changes in an uncontrolled manner; and
the variation of the relative phase compensates for the change in resonant frequency of the first wireless power transfer apparatus.

26. The method of claim 11, wherein:
a resonance frequency of the second wireless power transfer apparatus changes owing to a reactive impedance; and
the variation of the relative phase compensates for the change in resonant frequency of the second wireless power transfer apparatus by regulating magnitudes of respective reactive components of the first wireless power transfer apparatus and the second wireless power transfer apparatus to negate changes in reactive impedance that caused the change in the resonance frequency.

27. The method of claim 11, wherein:
a resonance frequency of the first wireless power transfer apparatus changes owing to a reactive impedance; and
the variation of the relative phase compensates for the change in resonant frequency of the first wireless power transfer apparatus by regulating magnitudes of respective reactive components of at least the first wireless power transfer apparatus to negate changes in reactive impedance that caused the change in the resonance frequency.

28. The method of claim 11, wherein:
independently controlling magnitude and direction of power transfer between the first wireless power transfer apparatus and the second wireless power transfer apparatus as well as an amount of compensation by controlling the relative phase and by controlling phase angles over which pairs of switches of the first wireless power transfer apparatus and the second wireless power transfer apparatus remain switched on.

29. The method of claim 11, wherein:
inductances of a first coupler of the first wireless power transfer apparatus and a second coupler of the second wireless power transfer apparatus have decreased beyond respective tuned values; and
the variation of the relative phase introduces extra inductive reactances in series with the first and second couplers, the extra inductive reactances negating the decrease in inductance of the first and second magnetic couplers.

30. The method of claim 29, further comprising:
varying respective converter phase angles of the first and second wireless power transfer apparatuses, the varying of the respective converter phase angles controlling magnitude and direction of power transfer at a desired level.

31. The method of claim 11, further comprising:
holding fixed a relative phase of operation of the first wireless power transfer apparatus with respect to the second wireless power transfer apparatus at a difference of plus 90 degrees or minus 90 degrees.

32. The method of claim 11, wherein:
the compensation of the reactive impedance is executed without varying a switching frequency and without adding switchable reactive elements and without compromising load/output regulation of at least the second wireless power transfer apparatus; and
power is transferred from the first wireless power transfer apparatus to the second wireless power transfer apparatus.

33. A method of operating a loosely coupled resonant inductive power transfer system, the method comprising controlling a reactive component of a load impedance, caused by mutual inductance between a first resonant inductive power transfer apparatus and a second resonant inductive power transfer apparatus while respective coils of the first resonant inductive power transfer apparatus and the second inductive power transfer apparatus are misaligned, to a non-zero value to compensate for the misalignment between the second resonant inductive power transfer apparatus and the first resonant inductive power transfer apparatus that detunes in the loosely coupled resonant inductive power transfer system, wherein the method includes varying a relative phase of operation of the first resonant inductive power transfer apparatus with respect to the second resonant inductive power transfer apparatus to compensate a reactive impedance of the first resonant inductive power transfer apparatus.

34. The method of claim 33, further comprising:
after controlling the reactive component of the load impedance, caused by mutual inductance between the first resonant inductive power transfer apparatus and the second resonant inductive power transfer apparatus while respective coils of the first resonant inductive power transfer apparatus and the second inductive power transfer apparatus are misaligned, to the zero value, controlling the reactive component of the load impedance, caused by mutual inductance between the first resonant inductive power transfer apparatus and the second resonant inductive power transfer apparatus while respective coils of the first resonant inductive power transfer apparatus and the second inductive power transfer apparatus are misaligned, to a zero value.

35. The method of claim 33, further comprising:
independently regulating output power of the second resonant inductive power transfer apparatus independently of an amount of compensation for the misalignment.

36. The method of claim 33, wherein:
the reactive component is controlled to compensate for changes in a resonant frequency of the second resonant inductive power transfer apparatus, wherein the second resonant inductive power transfer apparatus receives power from the first resonant inductive power transfer apparatus.

37. A method comprising reflecting a controlled compensatory reactive impedance, from a second resonant wireless power transfer apparatus to a first resonant wireless power transfer apparatus, while respective coils of the second resonant wireless power transfer apparatus and the first resonant wireless power transfer apparatus are misaligned, that is loosely coupled with the second resonant wireless power transfer apparatus, to compensate the first resonant wireless power transfer apparatus to unity power factor so as to compensate for the misalignment of the coils, wherein the method further comprises controlling a relative phase angle between a second resonant wireless power transfer apparatus converter and a first resonant wireless power transfer apparatus converter.

38. The method of claim 37, wherein the action of controlling the relative phase angle between the second resonant wireless power transfer apparatus converter and the first resonant wireless power transfer apparatus converter is executed to control the angle to a value other than positive 90 degrees and other than negative 90 degrees to create the controlled compensatory reactive impedance.

* * * * *